United States Patent [19]

Inoue et al.

[11] Patent Number: 5,750,273
[45] Date of Patent: May 12, 1998

[54] SOFT MAGNETIC THIN FILM AND THIN FILM MAGNETIC ELEMENT USING THE SAME

[75] Inventors: Tetsuo Inoue, Yokohama; Hiroshi Tomita, Tokyo; Tetsuhiko Mizoguchi, Yokohama; Hiromi Fuke, Kawasaki, all of Japan

[73] Assignee: Kabushiki Kaisha Toshiba, Kawasaki, Japan

[21] Appl. No.: 623,529

[22] Filed: Mar. 29, 1996

[30] Foreign Application Priority Data

Mar. 30, 1995 [JP] Japan .................. 7-072955

[51] Int. Cl.$^6$ .................................................. G11B 5/66
[52] U.S. Cl. .................. 428/692; 428/678; 428/685; 428/694 T; 428/900; 204/192.2; 148/304; 148/305
[58] Field of Search .................. 148/304, 305; 204/192.2; 428/678, 685, 692, 694 T, 900

[56] References Cited

U.S. PATENT DOCUMENTS 4,921,763   5/1990   Karamon .................. 428/692

FOREIGN PATENT DOCUMENTS

| 0 167 118 | 1/1986 | European Pat. Off. |
| 0 418 804 | 3/1991 | European Pat. Off. |
| 63-119209 | 5/1988 | Japan |
| 3-106003 | 5/1991 | Japan |

OTHER PUBLICATIONS

Patent Abstracts of Japan, vol. 15, No. 167, Apr. 26, 1991 and JP-A-03 036244, Feb. 15, 1991.
Patent Abstracts of Japan, vol. 15, No. 137, Apr. 5, 1991 & JP-A-03 020444, Jan. 29, 1991.
IEEE Translation Journal on Magnetics in Japan, Furukawa et al., "Soft Magnetic Properties of Nanocrystalline Fe–Ceramic Films", vol. 9, No. 5, Sep./Oct., 1994, pp. 80–87.

Primary Examiner—Leszek Kiliman
Attorney, Agent, or Firm—Finnegan, Henderson, Farabow, Garrett & Dunner, L.L.P.

[57] ABSTRACT

A thin film magnetic element is disclosed which uses a soft magnetic thin film having a composition represented by the general formula:

$$T_{100-x-y}M_x(AO_v)_y$$

(wherein T stands for at least one element selected from the group consisting of Fe and Co, M for at least one element selected from the group consisting of Zr, Hf, Nb, and Y, and A for at least one element selected from the group consisting of Si, Ge, Sn, B, P, and C, and x, y, and v respectively satisfy the expressions, $5 \leq x \leq 20$ at. %, $8 \leq y \leq 25$ at. %, and $0 \leq v \leq 2$), consisting of a homogeneous amorphous phase, and having resistivity of not less than 1000 $\mu\Omega$-cm. Further, a thin film magnetic element is disclosed which uses a soft magnetic thin film of a microstructure having a composition substantially represented by the general formula, $T_{100-x-z}M_x(AO_v)_z$ ($1 \leq z \pm 10$ at. %) and consisting of a microcrystalline phase and a first amorphous phase and a second amorphous phase disposed around the phases mentioned above.

10 Claims, 11 Drawing Sheets

SiO$_2$ CHIP AREA: 0 cm$^2$

FIG. 6B

SiO$_2$ CHIP AREA: 10 cm$^2$

FIG. 6C

SiO$_2$ CHIP AREA: 20 cm$^2$

FIG. 6D

SiO$_2$ CHIP AREA: 36 cm$^2$

BEFORE HEAT TREATMENT

FIG. 8B

AFTER HEAT TREATMENT

SOFT MAGNETIC THIN FILM AND THIN FILM MAGNETIC ELEMENT USING THE SAME

BACKGROUND OF THE INVENTION

1. Field of the Invention

This invention relates to a thin film magnetic element for use in such devices as, for example, thin film magnetic heads, thin film inductors, and thin film transformers, a soft magnetic thin film for use in the thin film magnetic element, and methods for the production thereof.

2. Description of the Related Art

The magnetic recording/regenerating devices such as the VTR, for example, have been directed toward the increase of recording density and frequency of recording signals for the purpose of promoting the improvement of image quality. In response to this trend, the magnetic heads have come to be demanded to use such a magnetic material as excels in high-frequency characteristics and, at the same time, possesses a high saturation magnetic flux density.

Further, as concerns the miniaturization of various kinds of electronic devices, the thin film inductors and the thin film transformers which can fulfill the essential condition therefor, namely the miniaturization of the power source parts of such devices, have been arresting growing interest. The working frequencies of these thin film magnetic elements have been likewise directed upward for the sake of allowing the elements to be miniaturized. The soft magnetic thin film for use in the thin film inductors and the thin film transformers, as a natural consequence, has come to be demanded to acquire improvement in high-frequency characteristics.

When the soft magnetic thin film is excited within a high-frequency band, the hysteresis loss and the eddy current loss which are entrained by an inversion of magnetization pose a problem. The soft magnetic thin film, therefore, must diminish the disposition thereof to degrade such properties to the fullest possible extent. The soft magnetic thin film itself is demanded to acquire higher resistivity particularly because the eddy current loss tends to grow in conspicuousness in the high-frequency excitation. It is considered that the compatibility between the decrease of loss and the increase of saturation magnetization in the high-frequency band will constitute a problem which gains in importance in proportion as the working frequencies of the magnetic elements shift from 10 MHz to 100 MHz in the future.

As soft magnetic thin films possessed of a high saturation magnetic flux density, the thin crystalline films of the Fe—Al—Si based alloys, the thin amorphous films of such metal-metalloid based alloys as Fe—B, Fe—Si—B, and Fe—Co—Si—B, and the thin amorphous films of such metal-metal based alloys as Co—Zr and Co—Zr—Nb have been known to date. The thin crystalline films of the Fe—Al—Si based alloys have electric resistivity, ρ of less than about 80 μΩ·cm and the thin films of the Fe—B based or Co—Zr based amorphous alloys have electric resistivity, ρ, of less than about 150 μΩ·cm. They are, therefore, at a disadvantage in entailing unduly heavy eddy current loss when they are given a thickness exceeding several μm and is excited in a high-frequency band, particularly in the MHz band.

To overcome such drawbacks of the conventional materials as mentioned above, heteroamorphous soft magnetic alloy thin films formed of two amorphous phases have been recently proposed as in the (Fe, Co)—(B, Si, P)—(Si, Al, Zn, Ti) based alloy and the (Fe, Co, Ni)—(B, Si, C) based alloy thin films (JP-A-63-119,209, JP-A-03-106,003, U.S. Pat. No. 4,921,763, etc. referring). Since the heteroamorphous soft magnetic alloy thin films described above have electric resistivity, ρ, of the order of ~1000 μΩ·cm as a film, they are capable of curbing the eddy current loss when they are used in the neighborhood of the band of 1 MHz. When they are considered for use in such a high-frequency band as exceeds the level of 2 to 3 MHz, however, they have the possibility of no longer repressing the loss fully satisfactorily because the increase of frequency results in enlarging the eddy current loss within the amorphous phases which are responsible for magnetic flux.

As described above, the thin film magnetic elements such as for thin film magnetic heads, thin film inductors, and thin film transformers which are adapted for miniaturization have been demanded to use soft magnetic thin films capable of manifesting perfect soft magnetic characteristics and high saturation magnetization in a high-frequency zone and, at the same time, lowering the loss and increasing the resistivity. It is held that the working frequencies of these thin film magnetic elements will essentially shift from the band of 1 MHz to that of 10 MHz to 100 MHz in the future. The conventional soft magnetic thin films possibly fail to lower the loss fully satisfactorily at such high operating frequencies. The development of a soft magnetic thin film which has high resistivity enough to permit a fully satisfactory decrease of the loss even at a working frequency exceeding the level of 1 MHz and, at the same time, has a perfect saturation magnetic flux density, therefore, is yearned for.

SUMMARY OF THE INVENTION

The present invention which has been produced with a view to coping with such problems as mentioned above aims to provide a soft magnetic thin film which fulfills the compatibility between highly satisfactory saturation magnetic flux density and high resistivity, a thin film magnetic element which uses the soft magnetic thin film of such quality and consequently acquires excellent characteristics particularly at a working frequency exceeding the level of 1 MHz, and methods for the production thereof.

The first soft magnetic thin film according to the present invention is characterized by having a composition represented by the general formula:

$$T_{100-x-y}M_x(AO_v)_y \qquad (1)$$

(wherein T stands for at least one element selected from the group consisting of Fe and Co, M for at least one element selected from the group consisting of Zr, Hf, Nb, and Y, and A for at least one element selected from the group consisting of Si, Ge, Sn, B, P, and C, and x, y, and v respectively satisfy the expressions, $5 \leq x \leq 20$ at. %, $8 \leq y \leq 25$ at. %, and $0 \leq v \leq 2$) and, at the same time, consisting of a homogeneous amorphous phase, and having resistivity of not less than 1000 μΩ·cm.

The second soft magnetic film of this invention is characterized by having a composition represented by the general formula:

$$T_{100-x-z}M_x(AO_v)_z \qquad (2)$$

(wherein T stands for at least one element selected from the group consisting of Fe and Co, M for at least one element selected from the group consisting of Zr, Hf, Nb, and Y, and A for at least one element selected from the group consisting of Si, Ge, Sn, B, P, and C, and x, z, and v respectively satisfy the expressions, $5 \leq x \leq 20$ at. %, $1 \leq z \leq 10$ at. %, and $0 \leq v \leq 2$) and, at the same time, having a microstructure consisting of a microcrystalline phase and a first amorphous phase and a second amorphous phase disposed around the aforementioned phases.

The first thin film magnetic element according to this invention is characterized by having the first soft magnetic thin film in close contact with a substrate.

The second thin film magnetic element of this invention is characterized by having the second soft magnetic thin film in close contact with a substrate.

The first method of this invention for the production of a soft magnetic thin film for a thin film magnetic element is a method for the production of the first soft magnetic thin film, characterized by comprising a step of forming the soft magnetic thin film by using a first film-forming source represented by the general formula; $T_{100-x}M_x$ (wherein T stands for at least one element selected from the group consisting of Fe and Co and M for at least one element selected from the group consisting of Zr, Hf, Nb, and Y and x satisfies the expression, $5 \leq x \leq 20$ at. %) and a second film-forming source represented by the general formula; $AO_w$ (wherein A stands for at least one element selected from the group consisting of Si, Ge, Sn, B, P, and C and w satisfies the expression, $1 \leq w \leq 2.5$) and having an area ratio in the range of 28 to 58%, based on the first film-forming source.

The second method of this invention for the production of a soft magnetic thin film for a thin film magnetic element is a method for the production of the second soft magnetic thin film, characterized by comprising a step of forming the soft magnetic thin film by using a first film-forming source represented by the general formula; $T_{100-x}M_x$ (wherein T stands for at least one element selected from the group consisting of Fe and Co and M for at least one element selected from the group consisting of Zr, Hf, Nb, and Y and x satisfies the expression, $5 \leq x \leq 20$ at. %) and a second film-forming source represented by the general formula; $AO_w$ (wherein A stands for at least one element selected from the group consisting of Si, Ge, Sn, B, P, and C and w satisfies the expression, $1 \leq w \leq 2.5$) and having an area ratio in the range of 3 to 28%, based on the first film-forming source in an ambience of not less than 2 Pa.

Now, the first soft magnetic thin film of this invention for a thin film magnetic element will be described in detail below.

The first soft magnetic thin film comprises a soft magnetic thin film having a composition represented by the formula (1) mentioned above and consisting of a homogeneous amorphous phase. The T element in the formula (1) is intended as a constituent bearing responsibility for magnetism and is at least one element selected from the group consisting of Fe and Co. As the T element, Fe alone, Co alone, or the combination of Fe and Co is used, whichever may best suit the occasion. The combination of Fe and Co is used particularly advantageously in respect that it acquires particularly high saturation magnetic flux density and, at the same time, exhibits a high Curie temperature.

Then, the M element is a constituent for promoting the impartation of an amorphous phase for the T element mentioned above. At least one element selected from the group consisting of Zr, Hf, Nb, and Y which have large atomic radii. By the incorporation of the M element having such a large atomic radius, the T element is enabled effectively to acquire the amorphous texture. The content of the M element is set in the range of 5 to 20 at. % (atomic %). If the content of the M element is less than 5 at. %, the impartation of an amorphous phase to the soft magnetic thin film will not be fully promoted. Conversely, if the content exceeds 20 at. %, the magnetization will be sharply degraded and the precipitation of a crystalline phase which is an inappropriate texture for a soft magnetic material will inevitably occur.

The A element is a constituent for promoting the impartation of a homogeneous amorphous phase to the soft magnetic thin film and, at the same time, contributing to improve such factors as temperature of crystallization, coercive force, anisotropic energy, and magnetorestriction. At least one metalloid element selected from the group consisting of Si, Ge, Sn, B, P, and C is used as the A element. Among the metalloid elements cited above, Ge and Si are preferably used in respect that they curb decline of saturated flux density. Further, Si is used more preferably in the sense that it precludes decline of the temperature of crystallization and promotes stabilization of an amorphous soft magnetic thin film. Alternatively, from the points of view of coercive force, anisotropic energy, and magnetorestriction, the A element may be properly selected to suit the purpose.

Though the first soft magnetic thin film for a thin film magnetic element is basically preferred to contain oxygen, it is not always required to contain oxygen. The content of oxygen, for the sake of ensuring formation of a homogeneous amorphous phase, is appropriately such that in the moiety of $AO_v$, the numerical value of v will be not less than 0.1. If the oxygen content is unduly large, the produced alloy will induce precipitation of an oxide phase. Thus, the numerical value of v is not more than 2.

The content of the A element mentioned above as $AO_v$ is in the range of 8 to 25 at. %. If the content of the A element as $AO_v$ is less than 8 at. %, the produced film will acquire a mixed phase consisting of a microcrystalline phase and an amorphous phase and preclude realization of resistivity of 1000 μΩ·cm or more. If the content of the A element as $AO_v$ conversely exceeds 25 at. %, the amorphous phase will no longer be retained stably. As is clearly noted from the working examples to be cited hereinbelow, the content of the A element is important for the purpose of enabling the soft magnetic thin film to acquire a homogeneous amorphous phase. By causing the present soft magnetic thin film to contain the A element in a relatively large amount as compared with the soft magnetic thin film to be used for the second thin film magnetic element, the formation of this soft magnetic thin film wholly with a homogeneous amorphous phase can be realized. More preferably, the content of the A element as $AO_v$ is in the range of 10 to 18 at. %.

Among other conceivable combinations of the M element and the A element, such combinations as (M, A)=(Zr, Si), (Zr, Ge), (Zr, Sn), and (Hf, Si) prove preferably in terms of saturation magnetization, magnetorestrictive constant, and temperature of crystallization.

Then, by having the composition adjusted in the range mentioned above and meanwhile optimizing such factors as the kind of film-forming source, the ambient pressure retained during the course of film formation, and the magnitude of power used which will be more specifically described hereinbelow, it is made possible to produce a soft magnetic thin film which acquires a homogeneously amorphous phase and fulfills improvement of resistivity to or above 1000 μΩ·cm. By curbing the loss of saturated flux density and further exalting the resistivity, ρ, of the soft magnetic thin film beyond 1000 μΩ·cm as described above, the eddy current loss can be repressed fully satisfactorily even when the thin magnetic film is used at a high frequency exceeding the level of 1 MHz. As a result, the loss incurred by the thin film magnetic element can be decreased as aimed at.

As concrete examples of the first thin film magnetic element of this invention, thin film magnetic heads which use a soft magnetic thin film as a magnetic core, magnetoresistive elements which use a soft magnetic thin film as a magnetic shield layer or a magnetic yoke, and thin film inductors and thin film transformers which use a soft magnetic thin film as a plane coil magnetic core may be cited. This invention need not be limited to these example but may be likewise applied to other thin film magnetic elements.

The first magnetic thin film of this invention for a thin film magnetic element described above can be obtained, for example, by preparing a first film-forming source substantially represented by the formula, $T_{100-x}M_x$, and a second film-forming source substantially represented by the formula, $AO_w$ ($1 \leq x \leq 2.5$), disposing them so that the ratio of the area, $S_2$, of the second film-forming source to the area, $S_1$, of the first film-forming source, i.e. $S_c$ (=$S_2/S_1 \times 100$), may fall in the range of 28 to 58%, and forming a soft magnetic thin film consisting of such a homogeneous amorphous phase as mentioned above by using the two film-forming sources mentioned above. The production is similarly implemented by the sputter method using two or more sputtering sources or the sputter method using one sole sputter source.

The step of forming the amorphous soft magnetic thin film mentioned above ought to be carried out in a manner proper for the kind of thin film magnetic element. When the thin film magnetic element is a thin film magnetic head, for example, this step is effected as a step of forming a pair of magnetic cores opposed to each other across an intervening magnetic gap. When the thin film magnetic film is a thin film inductor or a thin film transformer, the step is effected as a step of having a soft magnetic thin film superposed on at least either of the main surfaces of a plane coil through the medium of an insulating layer.

For the formation of the soft magnetic thin film mentioned above, such sputtering methods as The RF sputtering method, DC sputtering method, magnetron sputtering method, and ion beam sputtering method are suitably used. Alternatively, such physical vapor-phase growth (PVD) methods as the vacuum deposition method, ion plating method, and laser abrasion method are likewise usable.

Incidentally, the other conditions to be used during the step of forming the soft magnetic thin film may be set so as to suit the method of film formation to be adopted. The sputter gas pressure during the course of sputtering, for example, is to be not more than 3 Pa, preferably not more than 2 Pa.

Now, the second soft magnetic thin film of this invention for use in a thin film magnetic element will be described in detail below.

The second soft magnetic thin film has a composition substantially represented by the formula (2) mentioned above and, as shown in FIG. 1, for example, comprises a soft magnetic thin film 4 of a microstructure consisting of a microcrystalline phase 1, a first amorphous phase 2, and a second amorphous phase 3 disposed around the two phases mentioned above. In the present soft magnetic thin film, the microcrystalline phase 1 has as a main component thereof at least one T element selected from the group consisting of Fe and Co and contributes as to increasing the saturated flux density of the soft magnetic thin film. Then, the first amorphous phase 2 has as a main component thereof the same T element as in the microcrystalline phase 1 mentioned above and contributes as to improving the soft magnetic characteristics of the soft magnetic thin film.

Figure 1:
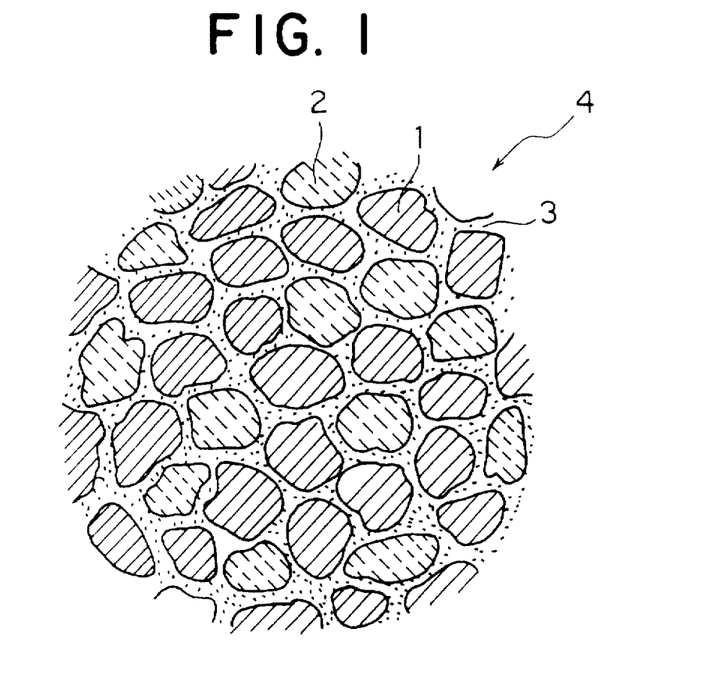
FIG. 1 is a diagram showing schematically the microstructure of a soft magnetic thin film to be used for the second thin film magnetic element of this invention.

The microcrystalline phase 1 and the first amorphous phase 2 mentioned above are surrounded by the second amorphous phase 3 which has as main components thereof the M element and the A element and is disposed in a network pattern around the phases mentioned above. Since the second amorphous phase 3 manifests high resistance, the soft magnetic thin film as a whole is enabled to acquire high resistivity such as, for example, the resistivity, $\rho$, falling in the range of 1000 to 2000 $\mu\Omega\cdot cm$. Since the individual islands of the microcrystalline phase 1 and the first amorphous phase 2 are magnetically connected, the film as a whole can secure highly satisfactory saturation magnetic flux density and soft magnetic characteristics. By causing the soft magnetic thin film to acquire such high resistivity, $\rho$, as to fall in the range of 1000 to 2000 $\mu\Omega\cdot cm$, the eddy current loss can be repressed fully satisfactorily even at a working frequency exceeding the level of 1 MHz. Thus, the loss incurred by the thin film magnetic element can be lowered as aimed at.

The microstructure which consists of the microcrystalline phase 1, the first amorphous phase 2, and the second amorphous phase 3 disposed in a network pattern around the two phases as mentioned above can be obtained by having the composition adjusted in the range mentioned of the formula (2) mentioned above and meanwhile optimizing such factors as the kind of film-forming source, the ambient pressure retained during the course of film formation, and the magnitude of power used which will be more specifically described hereinbelow.

The second soft magnetic thin film for use in a thin film magnetic element has a composition substantially represented by the formula (2) mentioned above. The T element and the M element in the formula (2) both have the same functions as the T element and the M element in the first soft magnetic thin film for use in a thin film magnetic element. The preferred species of these elements and their contents are the same as those for the first soft magnetic thin film.

The A element is a constituent for promoting the impartation of a partial amorphous phase to the soft magnetic thin film and, at the same time, contributing to improve such factors as temperature of crystallization, coercive force, anisotropic energy, and magnetorestriction. At least one metalloid element selected from the group consisting of Si, Ge, Sn, B, P, and C is used as the A element. Among the metalloid elements cited above, Ge and Si are preferably used in respect that they curb decline of saturated flux density. Further, Si is used more preferably in the sense that it precludes decline of the temperature of crystallization and promotes stabilization of an amorphous phase. Alternatively, from the points of view of coercive force, anisotropic energy, and magnetorestriction, the A element may be properly selected to suit the purpose.

Though the second soft magnetic thin film for use in a thin film magnetic element may contain oxygen, it is not always required to contain oxygen. From the point of view of obtaining such a microstructure as described above, the soft magnetic thin film is preferred to decrease the oxygen content thereof. The oxygen content as $AO_v$ is appropriately such that the value of v may be not more than 1.5. Since an unduly high oxygen content entrains precipitation of a second crystalline phase, the largest permissible value of v is not more than 2.

The content of the A element mentioned above as $AO_v$ is in the range of 1 to 10 at. %. If the content of the A element as $AO_y$ is less than 1 at. %, the second amorphous phase will no longer be stably retained. If the content of the A element as $AO_y$ exceeds 10 at %, the saturation magnetization will abruptly decline and the coercive force will increase. The content of the A element is preferred to be in the range of 2 to 9 at. %.

The combinations of the M element and the A element which prove preferable herein are the same as those in the first soft magnetic thin film for use in a thin film magnetic element. The concrete examples of the second thin film magnetic element are also the same as those of the first thin film magnetic element mentioned above.

The second thin film magnetic element of this invention which is described above is obtained, for example, by preparing a first film-forming source substantially represented by the formula, $T_{100-x}M_x$, and a second film-forming source substantially represented by the formula, $AO_w$ ($1 \leq x \leq 2.5$), disposing them so that the ratio of the area, $S_2$, of the second film-forming source to the area, $S_1$, of the first film-forming source, i.e. $S_c$ ($=S_2/S_1 \times 100$), may fall in the range of 3 to 28%, and forming a soft magnetic thin film consisting of such a microstructure of the form of a mixed phase as mentioned above in an ambience of not less than 2 Pa. The production is similarly implemented by the sputter method using two or more sputtering sources or the sputter method using one sole sputter source.

The step of forming the mixed-phase soft magnetic thin film is implemented in a form proper for the kind of thin film magnetic element similarly to that of forming the first thin film magnetic element mentioned above. Further, the method for the formation of the soft magnetic thin film and the method for disposing the first film-forming source and the second film-forming source may be the same as those adopted for the soft magnetic thin film for use in the first thin film magnetic element.

In the step of forming the soft magnetic thin film described above, the ambient pressure during the course of film formation is important besides the area ratio, $S_c$, between the first and the second film-forming source. By setting this ambient pressure at or above 2 Pa, it is made possible to obtain a microstructure which has the second amorphous phase disposed around the micro-crystalline phase and the first amorphous phase. If the ambient pressure during the course of film formation is less than 2 Pa, the produced microstructure consists of a microcrystalline phase and a single amorphous phase filling the immediate neighborhood of the microcrystalline phase. Conversely, if the area ratio, $S_c$, exceeds 28%, an additional microcrystalline phase will be precipitated. Preferably, the area ratio, $S_c$, is in the range of 5 to 20%.

Incidentally, the other conditions to be used during the step of forming the soft magnetic thin film may be set so as to suit the method of film formation to be adopted.

DESCRIPTION OF THE PREFERRED EMBODIMENTS

Now, preferred embodiments of this invention will be described below.

First, an example of the first thin film magnetic element of this invention will be described. Preparatorily to the explanation of the thin film magnetic element, examples of the production of soft magnetic thin films for use in the first thin film magnetic element and the results of rating of the properties thereof will be described.

Embodiment 1

A soft magnetic thin film to be used for the first thin film magnetic element was produced as follows. Varying numbers in the range of 0 to 36 of $SiO_2$ chips 10 mm×10 mm×2.3 mm were evenly mounted severally on erosion patterns drawn on disklike alloy targets having a composition of $Fe_{0.68}Co_{0.17}Zr_{0.15}$ and measuring 125 mm in diameter×3 mm in thickness. The $Fe_{0.68}CO_{0.17}Zr_{0.15}$ alloy targets having the $SiO_2$ chips mounted thereon in varied numbers were set in place in an RF magnetron sputter device and sputtered to form sputter films on relevant Si substrates (0.6 mm in thickness) provided with a thermally oxidized $SiO_2$ coating. The power fed for sputtering was fixed at 3.3 W/cm², the distance between the target and the substrate at 75 mm, and the argon gas pressure at 1.6 Pa. The film forming conditions are shown in Table 1.

TABLE 1

Conditions for forming Fe—Co—Zr—Si base thin film

| | |
|---|---|
| Preparatory evacuation | Not more than $4 \times 10^{-4}$ Pa |
| Target | $Fe_{0.68}Co_{0.17}Zr_{0.15}$ targets with 0 to 36 $SiO_2$ chips |
| Target area ratio, $S_c$ *1 | 4.3–41.5% |
| Sputter gas | Ar |
| Sputter gas pressure | 1.6 Pa (500 sccm) |
| Power consumed | 3.3 W/cm² |
| Distance between target and substrate | 75 mm |
| Substrate | Thermally oxidized $SiO_2/Si(100)$ |
| Substrate temperature | Room temperature |

*1: $S_c$ = ($SiO_2$ chip area/$Fe_{0.68}Co_{0.17}Zr_{0.15}$ target area) × 100

The sputter films (0.1 μm in thickness) thus obtained were analyzed for structure by the X-ray diffraction [thin film method, bulb Cu (wavelength=0.154056 nm), angle of incidence=2°, 2θ: 10 to 100°] and the TEM observation.

Figure 2:
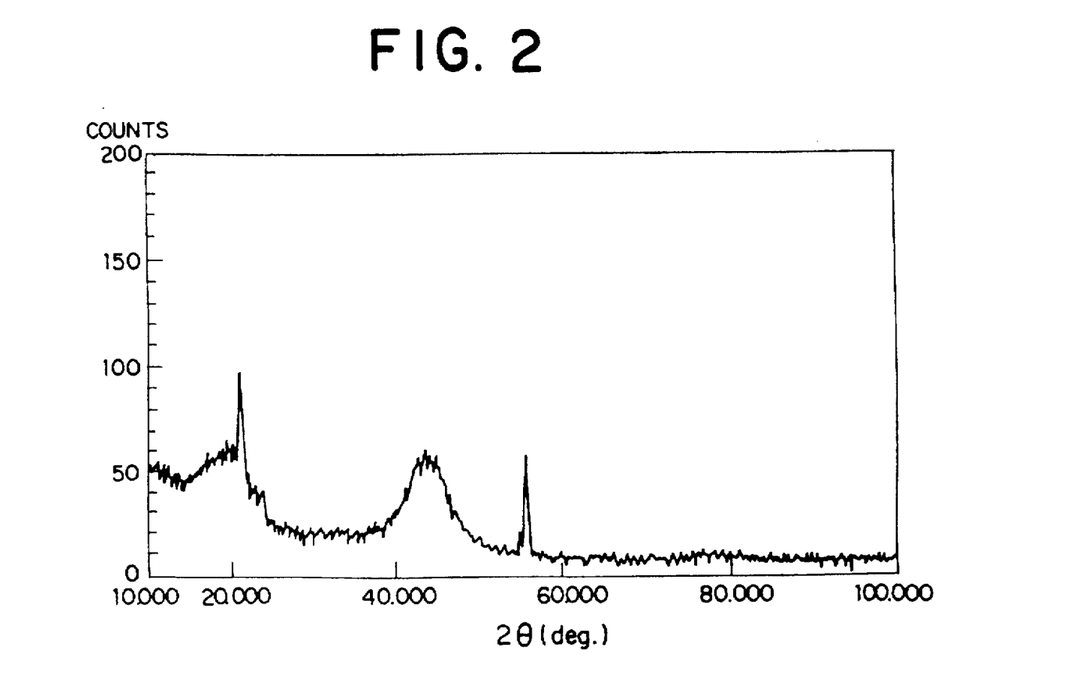
FIG. 2 is a diagram showing the X-ray diffraction pattern of a soft magnetic thin film according to the embodiment 1 of this invention.

One example of the X-ray diffraction pattern ($SiO_2$ chip area=36 cm²) is shown in FIG. 2. In the X-ray diffraction pattern shown in FIG. 2, peaks near 2θ=20°, 54°, and 56° are accounted for invariably by the substrate, a broad peak near 44° is accounted for by the amorphous diffraction peak of the sample, and no crystal peak is present.

Figure 3:
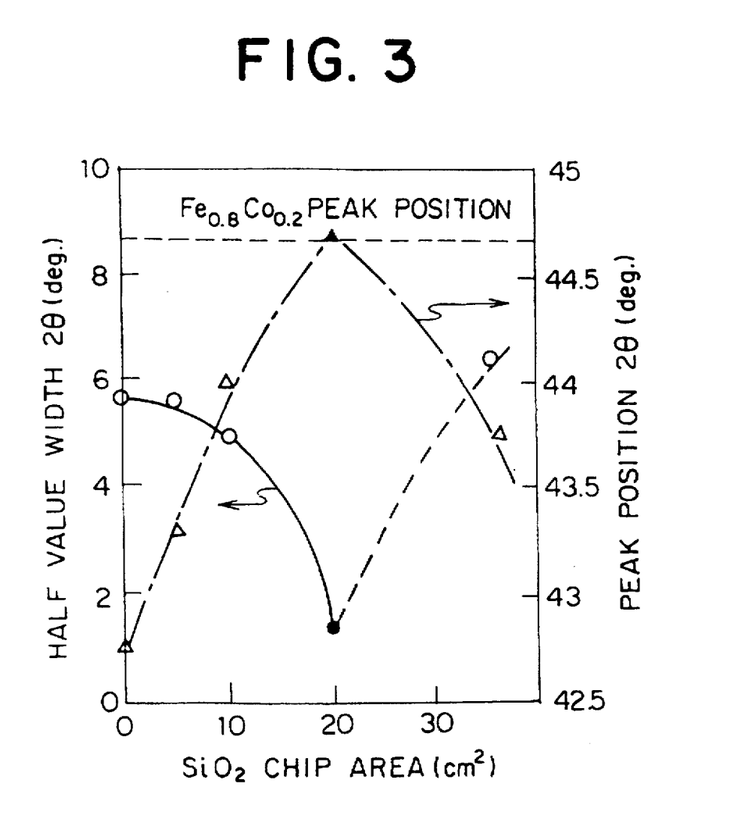
FIG. 3 is a diagram showing the dependency of the half-value width and the peak position on the $SiO_2$ chip area obtained as the result of the X-ray diffraction of the soft magnetic thin film produced in the embodiment 1 of this invention.

FIG. 3 shows the half-value width and the peak position (2θ) as the results of the X-ray diffraction respectively as functions of the $SiO_2$ chip area. It is clear from FIG. 3 that the half-value width decreases in proportion to the increase of the $SiO_2$ chip area, reaches the minimum at the chip area of 20 cm², and then increases with the continued increase of the chip area. The peak position (2θ) shifts toward the higher angle side in proportion to the increase of the $SiO_2$ chip area, reaches the maximum at the chip area of 20 cm², and then shifts toward the lower angle side in proportion to the further continued increase of the chip area.

Then, sputter films produced with varied $SiO_2$ chip areas, (a) 10 cm² ($S_c$=8.9%), (b) 20 cm² ($S_c$=19.4%), and (c) 36 cm² ($S_c$=41.5%), were subjected to TEM observation. It was found that the film of (a) consisted of microcrystalline particles about 5 nm in diameter and an amorphous phase filling the gaps intervening between the microcrystalline particles, the film of (b) consisted of crystalline particles of a larger diameter of about 20 nm and an amorphous phase filling the gaps intervening between the crystalline particles, and the film of (c) consisted of a homogeneous amorphous phase.

It is clearly noted from FIG. 2, FIG. 3, and the results of the TEM observation mentioned above that the crystallization advances in proportion as the $SiO_2$ chip area increases from the state of mixed phase consisting of a microcrystalline phase and an amorphous phase, reaches a peak at a $SiO_2$ chip area of 20 cm², and changes to a homogeneous amorphous state in proportion to the continued increase of the chip area. The results of the TEM observation mentioned above indicate that the film of (c) using the $SiO_2$ chip area of 36 cm² ($S_c$=41.5%) consisted of a homogeneous amorphous phase, that this film qualified as an amorphous soft magnetic thin film for use in the first thin film magnetic element, and that it constituted a soft magnetic thin film in the first thin film magnetic element.

Figure 4:
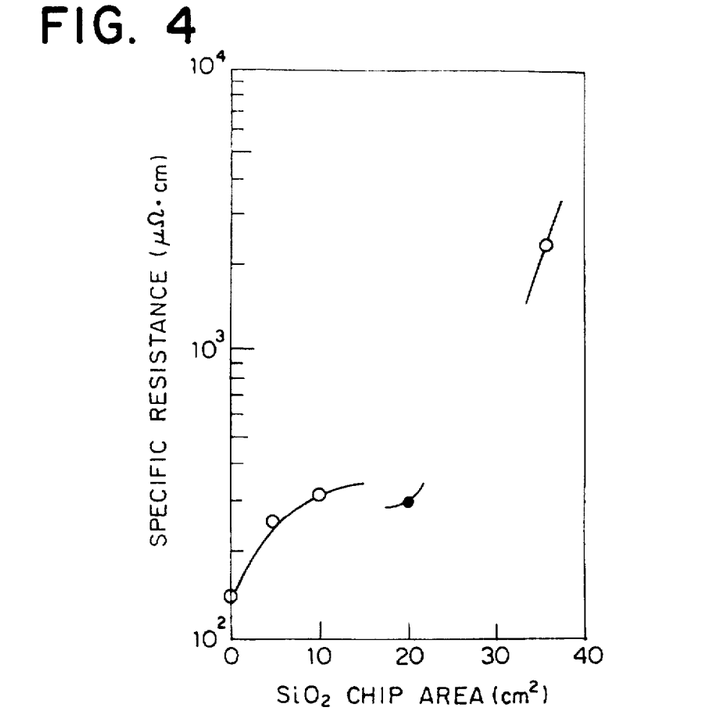
FIG. 4 is a diagram showing the dependency of the resistivity of the soft magnetic thin film produced in the embodiment 1 of this invention on the $SiO_2$ chip area.

In association with the change of the microstructure mentioned above, the resistivity showed an inclination to increase in proportion to the increase of the $SiO_2$ chip area as shown in FIG. 4 and the film of (c) having the $SiO_2$ chip area of 36 cm² showed resistivity of 2470 μΩ·cm. In consideration of the fact that the films (a), (b), and (c) mentioned above invariably had an amorphous phase and that the resistivity of the amorphous phase manifested a predominant effect, it is inferred that the films using $SiO_2$ chip areas of 0 to 20 cm² only acquired such magnitudes of resistivity as corresponded to their amorphous phases and that, in the films using $SiO_2$ chip areas exceeding 20 cm² and consequently entailing disappearance of their crystalline phases, the Si formerly concentrated within crystalline particles were uniformly distributed throughout the films and the magnitudes of resistivity within their amorphous phases suddenly increased.

Figure 5:
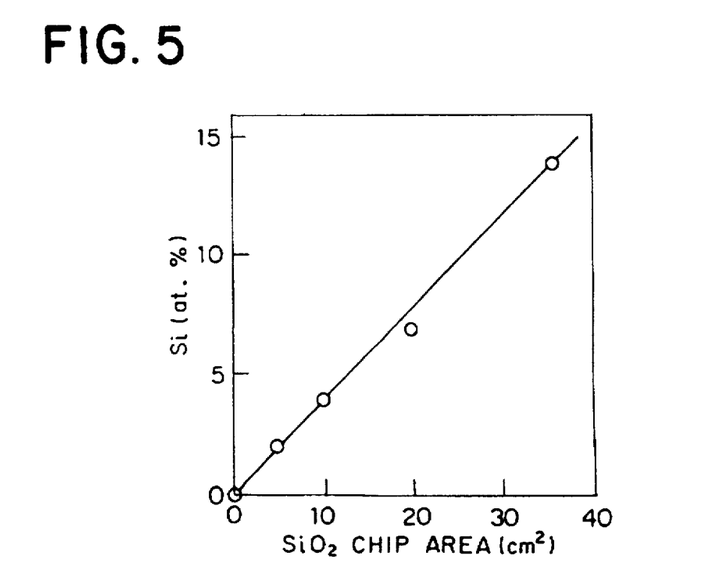
FIG. 5 is a diagram showing the dependency of the composition of the soft magnetic thin film produced in the embodiment 1 of this invention on the $SiO_2$ chip area.

Table 2 and FIG. 5 show the film compositions obtained with the Ar pressure fixed at 1.6 Pa and the $SiO_2$ chip area varied. The data are based on the assumption that the total amount of the main components Fe, Co, Zr, and Si is 100 at %. It is noted from the main Table 2 that the ratios of combination of Fe, Co, and Zr substantially coincided with those in the targets at the time of charging. FIG. 5 is a diagram showing the relation between the amount (at. %) of Si in the produced films and the $SiO_2$ chip areas. This diagram shows that the proportion of Si in the composition increased substantially linearly in proportion to the increase of the $SiO_2$ chip area. This fact indicates that the increase of the proportion of Si proportionate to the increase of the $SiO_2$ chip area brought about the changes in the fine structure and the resistivity mentioned above.

TABLE 2

| $SiO_2$ chip area (cm²) | Film composition (at. %) | | | |
|---|---|---|---|---|
| | Fe | Co | Zr | Si |
| 5 | 66.3 | 17.9 | 13.9 | 1.9 |
| 10 | 64.9 | 17.3 | 13.8 | 3.9 |
| 20 | 62.9 | 16.6 | 13.6 | 7.0 |
| 36 | 58.0 | 15.4 | 12.9 | 13.7 |

Figure 6A:
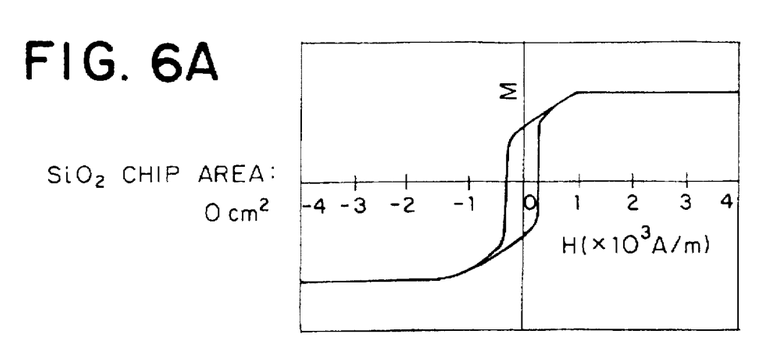
FIG. 6A, FIG. 6B, FIG. 6C, and FIG. 6D are diagrams showing the dependency of the magnetic hysteresis curves of soft magnetic thin films produced in the embodiment 1 of this invention on the $SiO_2$ chip area.
Figure 6B:
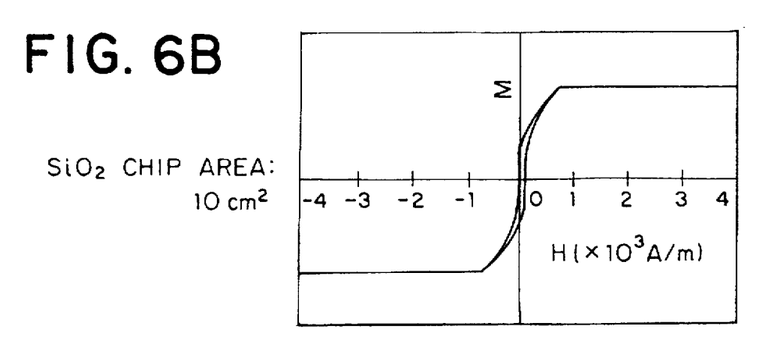
Figure 6C:
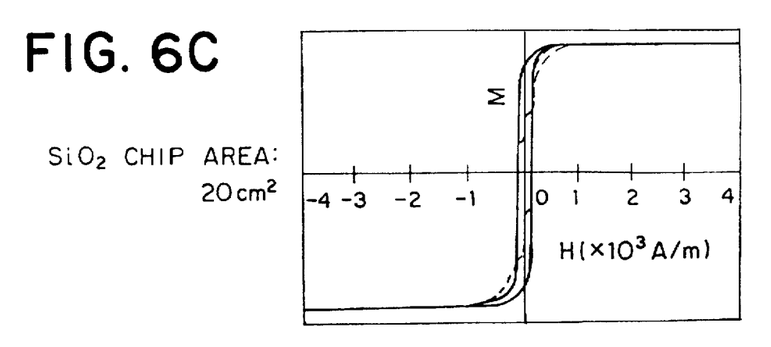
Figure 6D:
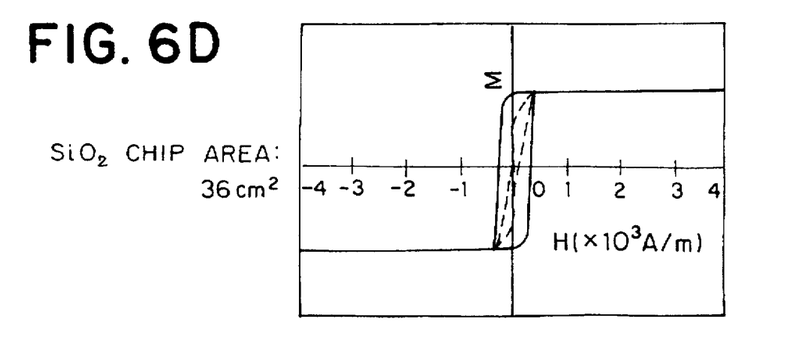

FIGS. 6A, 6B, 6C, and 6D show the magnetic hysteresis curves of the films functions of $SiO_2$ chip areas. In FIGS. 6C and 6D, the solid lines represent the magnetic hysteresis curves in the direction of easy axis of magnetization and the broken lines those in the direction of hard axis of magnetization. The films having small $SiO_2$ chip areas (0 to 10 cm²) manifested no anisotropy but was isotropic in film plane (FIGS. 6A, 6B).

The film having the $SiO_2$ chip area of 20 cm² behaved like a vertical magnetic anisotropic film and was isotropic. It is inferred that the vertical magnetic anisotropy was derived from microcrystals having the (100) plane parallel to the surface of film.

The film having the $SiO_2$ chip area of 36 cm² behaved like an in-plane magnetic anisotropic film. This behavior may be explained by a supposition that the anisotropy of sample shape which we used for magnetic properties measurement gained predominance because of the disappearance of microcrystals.

Figure 7:
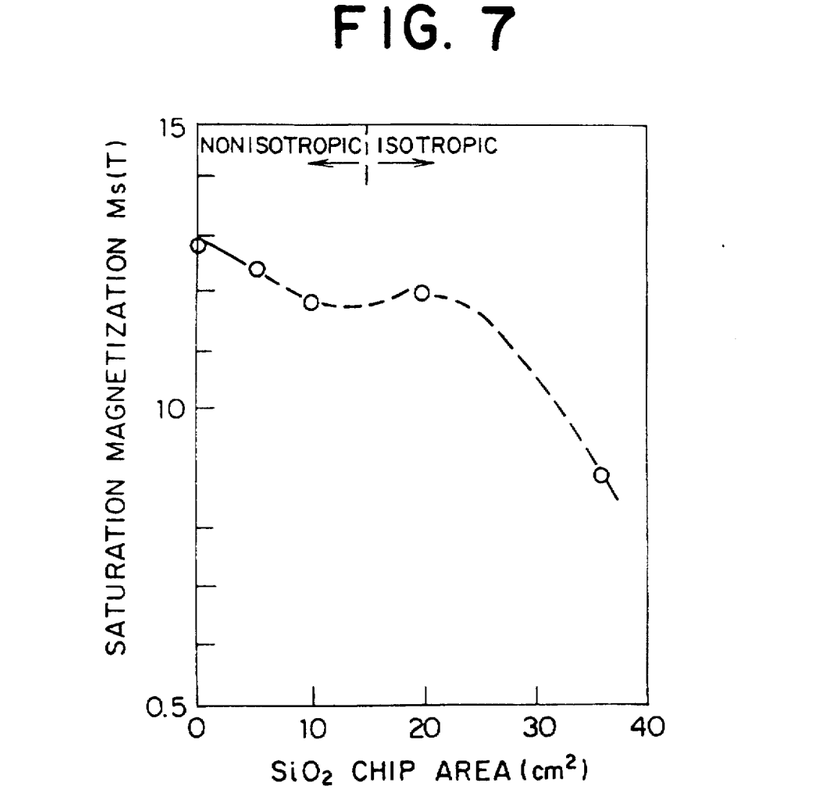
FIG. 7 is a diagram showing the dependency of the saturation magnetization, $M_s$, of a soft magnetic thin film produced in the embodiment 1 of this invention on the $SiO_2$ chip area.

FIG. 7 shows the saturation magnetization, $M_s$, as a function of the $SiO_2$ chip area. The saturation magnetization, $M_s$, showed an inclination to decrease in proportion to the increase of the $SiO_2$ chip area. It is noted from this diagram that the soft magnetic characteristics necessary for a soft magnetic thin film to be used in a thin film magnetic element are retained even when the $SiO_2$ chip area is enlarged so much as to permit acquisition of resistivity exceeding 1000 μΩ·cm.

It has been demonstrated that the soft magnetic thin film (having an $SiO_2$ chip area of 36 cm²) according to the first embodiment acquires high resistivity of not less than 1000

μΩ·cm and retains soft magnetic characteristics necessary for a thin film magnetic element.

Figure 8A:
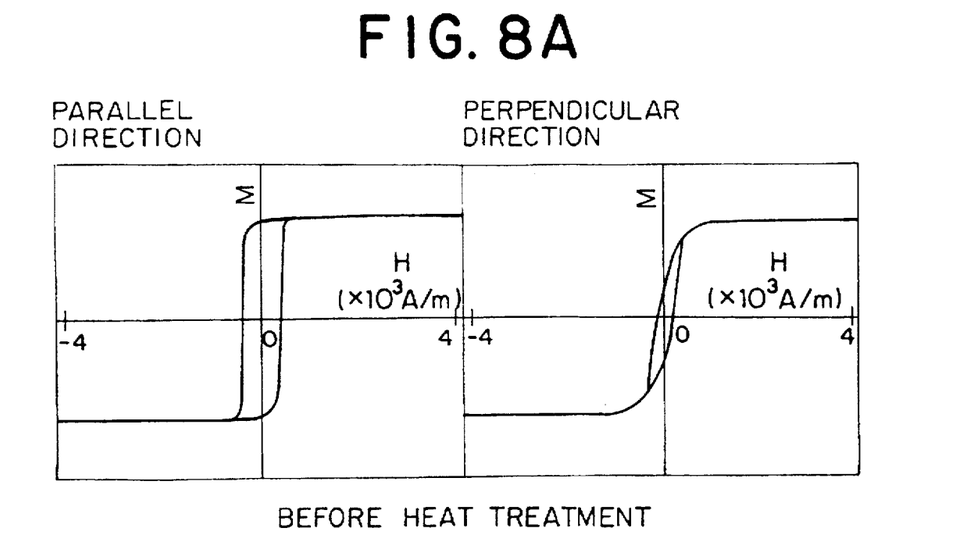
FIG. 8A and FIG. 8B are diagrams showing the magnetic hysteresis curves obtained before and after the performance of the heat treatment in a DC magnetic field on the soft magnetic thin film according to the embodiment 1 of this invention.
Figure 8B:
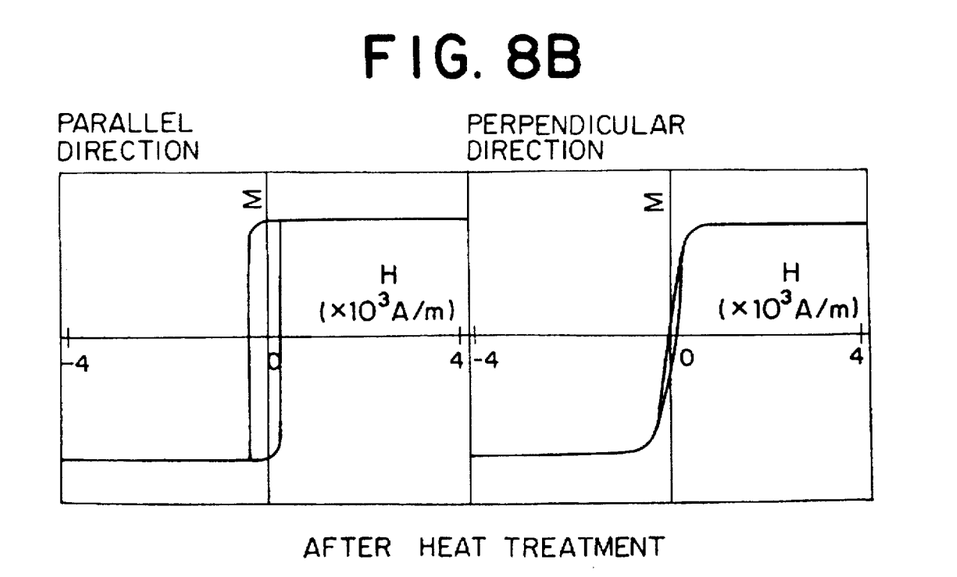

FIGS. 8A and 8B show changes caused in the magnetic hysteresis curve of a sample produced with an $SiO_2$ chip area of 36 $cm^2$ by a heat treatment performed at 573K×one hour in a DC magnetic field of 120 kA/m. It is noted from FIGS. 8A and 8B that the sample manifested conspicuous anisotropy after the heat treatment [FIG. 8B] as compared with the same sample before the heat treatment [FIG. 8A].

Figure 9A:
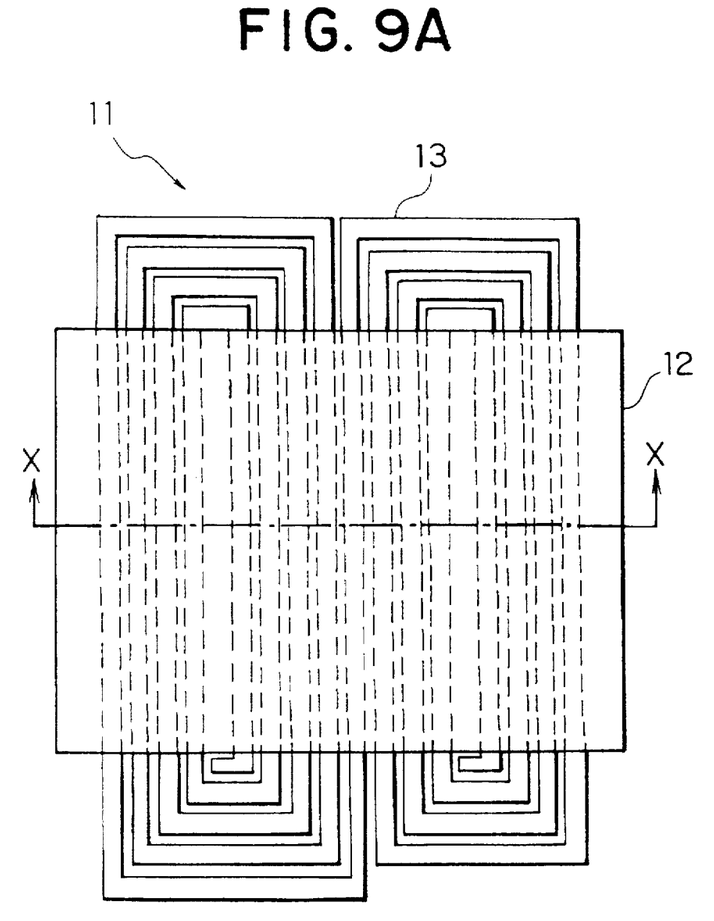
FIG. 9A and FIG. 9B are respectively a plan view and a cross section showing schematically the structure of a thin film inductor produced in the embodiment 1 of this invention.
Figure 9B:
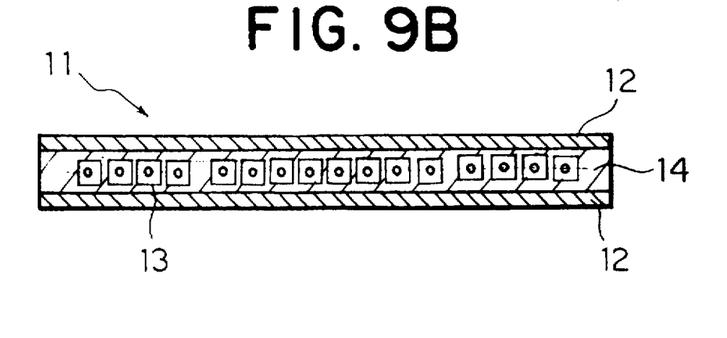

Now, an example of the use of the soft magnetic thin film of the embodiment 1 as a thin film magnetic element will be described below. Under the same conditions used for the soft magnetic thin film as mentioned above, a soft magnetic film 12 part of a thin film inductor 11 shown in a top view in FIG. 9A and in a cross section in FIG. 9B was manufactured. The thin film inductor 11 shown in FIG. 9 was constructed by superposing soft magnetic films 12, 12 on the opposite main surfaces of a double spiral type planar coil 13. The planar coil 13 was insulated from the soft magnetic films 12, 12 severally with an insulating layer 14. The thin film inductor 11 of this example acquired highly satisfactory properties as evinced by a substantially flat inductance up to 10 MHz and a quality factor, Q, of not less than 10 at 8 MHz.

Figure 10:
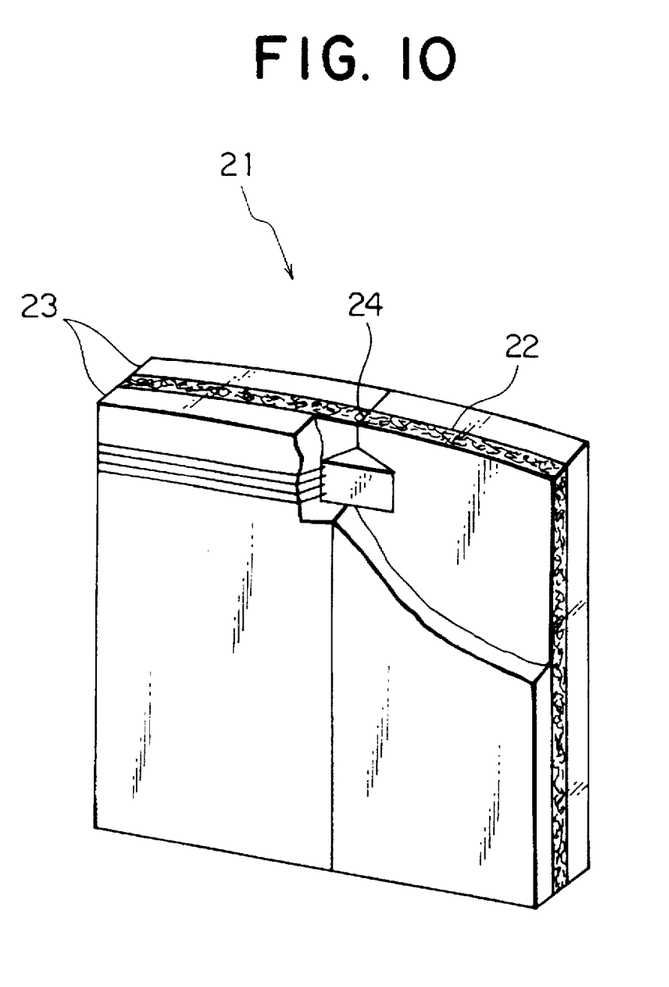
FIG. 10 represents one example of the thin film magnetic element produced with the soft magnetic film produced in the embodiment 1 of this invention.

A thin film magnetic head 21 having a gap 24 shown in FIG. 10 was manufactured by the use of amorphous soft magnetic thin films 22 which were formed under the same conditions as used for the soft magnetic thin film of the example cited above. Specifically, the thin film magnetic head 21 was produced by coating one surface of a nonmagnetic glass substrate 23 with glass and having the amorphous soft magnetic thin films and the insulating films mentioned above alternately superposed to a prescribed thickness on the other surface of the nonmagnetic glass substrate 23. When this thin film magnetic head was tested for properties by the use of a drum tester and a metal tape at frequencies of 5 MHz and 8.5 MHz, it produced highly satisfactory results including an output ratio (8.5 MHz/5 MHz) of −4 to −5 dB determined by the use of an optimum recording current.

Embodiment 2

Now, an example of the second thin film magnetic element of this invention will be described.

Preparatorily to the explanation of the thin film magnetic element, examples of the soft magnetic thin film for use in the second thin film magnetic element and the results of rating of the properties thereof will be described.

The soft magnetic thin films to be used for the thin film magnetic element of the embodiment 2 were obtained as follows. Ten $SiO_2$ chips measuring 10 mm×10 mm×2.3 mm were disposed evenly on an erosion pattern on disklike alloy targets having a composition of $Fe_{0.68}CO_{0.17}Zr_{0.15}$ and measuring 125 mm in diameter and 3 mm in thickness. The $Fe_{0.68}CO_{0.17}Zr_{0.15}$ alloy targets having 10 $SiO_2$ chips mounted thereon were set in place in an RF magnetron sputter device and sputtered on an Si substrate (0.6 mm in thickness) provided with a thermally oxidized $SiO_2$ coating. The power supplied for the sputtering was fixed at 3.3 $W/cm^2$ and the distance between the target and the substrate at 75 mm and the Ar gas pressure was varied in the range of 1.3 to 3.3 Pa. The film forming conditions are shown in Table 3.

TABLE 3

| Conditions for forming Fe—Co—Zr—Si base thin film | |
|---|---|
| Preparatory evacuation | Not more than $4 \times 10^{-4}$ Pa |
| Target | $Fe_{0.68}Co_{0.17}Zr_{0.15}$ alloy target with 10 $SiO_2$ chips |
| Target area ratio, $S_c$ *1 | 8.9% |
| Sputter gas pressure | 1.3–3.3 Pa (362–900 sccm) |
| Power consumed | 3.3 $W/cm^2$ |
| Distance between target and substrate | 75 mm |
| Substrate | Thermally oxidized $SiO_2/Si(100)$ |
| Substrate temperature | Room temperature |

*1:$S_c$ = ($SiO_2$ chip area/$Fe_{0.68}Co_{0.17}Zr_{0.15}$ alloy target area) × 100

The sputter films (0.1 μm in thickness) thus obtained were analyzed for structure by the X-ray diffraction [thin film method, bulb Cu (wavelength=0.154056 nm), angle of incidence=2°, 2θ: 10 to 100°] and the TEM observation.

Figure 11:
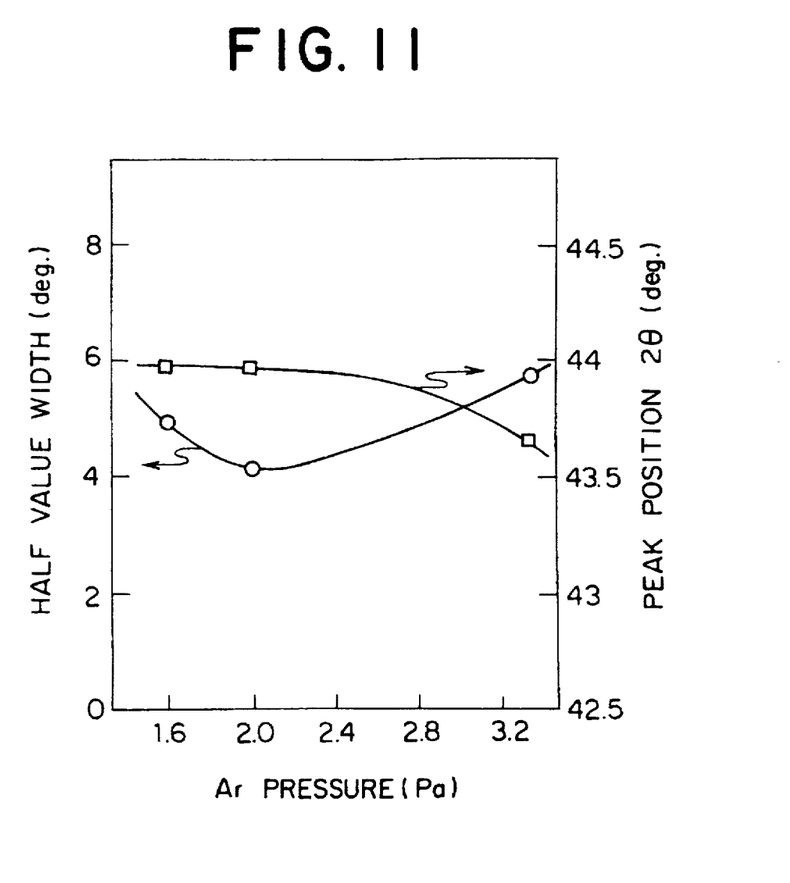
FIG. 11 is a diagram showing the dependency of the half-value width and the peak position on the Ar gas pressure obtained as the result of the X-ray diffraction of the soft magnetic thin film produced in the embodiment 2 of this invention.

FIG. 11 shows the half-value width and the peak position (2θ) as the results of the X-ray diffraction respectively as functions of the Ar gas pressure. It is clear from FIG. 11 that the half-value width and the peak position (2θ) showed no extreme dependency on the Ar gas pressure. Films (d) and (e) formed by the sputtering under the conditions shown in Table 3 while using Ar gas pressures respectively of 1.6 Pa (d) and 3.3 Pa (e) were tested by the TEM observation. The results of this test indicate that the film of (d) consisted of microcrystalline particles of a diameter of about 5 nm and an amorphous phase filling the gaps intervening between the microcrystalline particles and the film of (e) consisted of microcrystalline particles of a diameter of about 5 nm and two amorphous phases with clear contrast, one of which was disposed so as to fill the immediate neighborhoods of the microcrystalline particles and the other amorphous granular phase.

It is clearly noted from FIG. 11 and the results of the TEM observation mentioned above that by increasing the Ar gas pressure, it was made possible to obtain the soft magnetic thin film of the microstructure which consisted of microcrystalline particles and a granular amorphous phase and another amorphous phase disposed to fill the immediate neighborhoods of the micro-crystalline particles and the granular amorphous phase. It is clear from the results of the TEM observation mentioned above that the film of (e) produced by using an Ar gas pressure of 3.3 Pa qualified as a mixed-phase soft magnetic thin film for use in the second thin film magnetic element.

Figure 12:
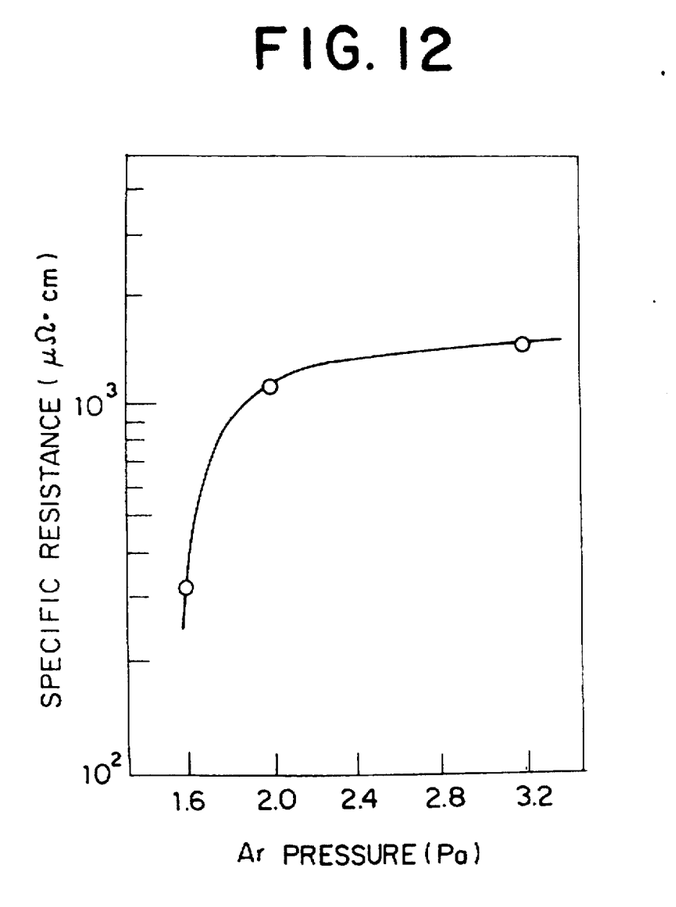
FIG. 12 is a diagram showing the dependency of the resistivity of the soft magnetic thin film produced in the embodiment 2 of this invention on the Ar gas pressure.

In association with the change of the microstructure mentioned above, the resistivity showed an inclination to increase in proportion to the increase of the Ar gas pressure as shown in FIG. 12 and the film produced by using an Ar gas pressure of 3.3 Pa showed resistivity of 1440 μΩ·cm.

Figure 13:
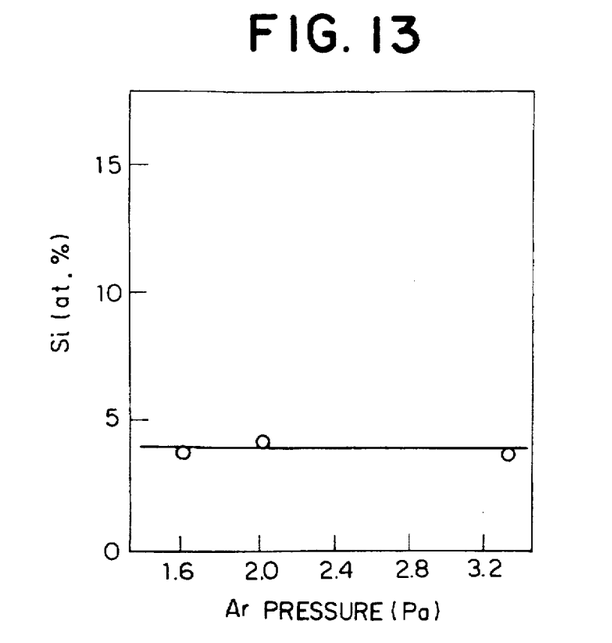
FIG. 13 is a diagram showing the dependency of the composition of the soft magnetic thin film produced in the embodiment 2 of this invention on the Ar gas pressure.

Table 4 and FIG. 13 show the film compositions obtained as functions of the magnitudes of Ar pressure. The data are based on the assumption that the total amount of the main components Fe, Co, Zr, and Si is 100 at %. It is noted from Table 4 that the ratios of combination of Fe, Co, and Zr substantially coincided with those in the targets at the time of charging. FIG. 13 is a diagram showing the relation between the amount (at. %) of Si in the produced films and the Ar gas pressure. This diagram shows that the proportion of Si in the composition showed virtually no change relative to the Ar gas pressure. This fact indicates that the changes of the microstructure and the resistivity mentioned above were not brought about by changes in composition.

TABLE 4

| Ar gas pressure (Pa) | Film composition (at. %) | | | |
|---|---|---|---|---|
| | Fe | Co | Zr | Si |
| 1.6 | 64.9 | 17.3 | 13.8 | 3.9 |
| 2.0 | 64.5 | 17.2 | 14.1 | 4.2 |
| 3.3 | 64.7 | 17.0 | 14.5 | 3.8 |

Figure 14:
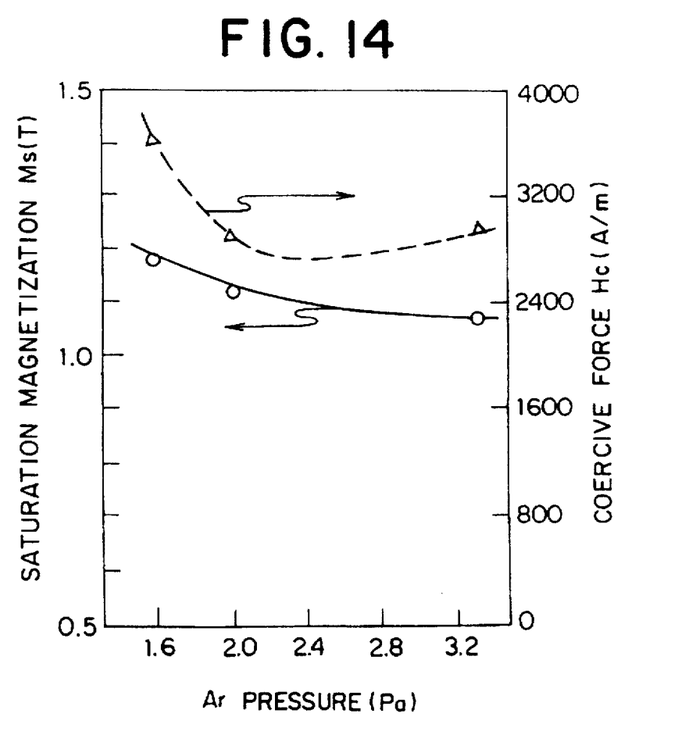
FIG. 14 is a diagram showing the dependency of the saturation magnetization, $M_s$, and the coercive force, $H_c$, of the soft magnetic thin film produced in the embodiment 2 of this invention on the Ar gas pressure.

FIG. 14 shows the saturation magnetization, $M_s$, and the coercive force, $H_c$, as functions of the Ar gas pressure. It is noted from the diagram that the saturation magnetization, $M_s$, showed an inclination to decrease in proportion as the Ar gas pressure increased and the coercive force, $H_c$, showed an inclination to decrease temporarily in proportion as the Ar gas pressure increased and an inclination to increase past the boundary of about 2 Pa with the continued increase of the Ar gas pressure. It is noted from this diagram that the soft magnetic characteristics necessary for a soft magnetic thin film to be used in a thin film magnetic element are retained even when the Ar gas pressure is increased to such an extent as to permit acquisition of resistivity exceeding 1000 μΩ·cm.

It has been demonstrated that the soft magnetic thin film (produced by using an Ar gas pressure of 3.3 Pa) according to the present embodiment acquires high resistivity of not less than 1000 μΩ·cm and retains soft magnetic characteristics necessary for a thin film magnetic element.

Now, the thin film magnetic element in the embodiment 2 will be described below. Under the same conditions used for the mixed phase soft magnetic thin film as mentioned above, a soft magnetic film 12 part of a thin film inductor 11 shown in FIGS. 9A and 9B was manufactured. The thin film inductor of this example acquired highly satisfactory properties as evinced by a substantially flat inductance up to 8 MHz and a quality factor, Q, of not less than 8 at 5 MHz.

As described above, the thin film magnetic element of this invention can repress the eddy current loss even at an operating frequency exceeding a high frequency zone of the level of MHz because it uses a soft magnetic thin film which simultaneously fulfills high electric resistance and highly satisfactory saturation magnetic flux density. When the thin film magnetic element of this invention is applied as, for example, in a thin film magnetic head, it serves the purpose of enhancing the regeneration output of the magnetic head. When it is applied in a thin film inductor, for example, it serves the purpose of improving the energy conversion efficiency.

What is claimed is:

1. A soft magnetic film characterized by having a composition substantially represented by the general formula:

$$T_{100-x-z}M_x(AO_v)_z \quad (2)$$

wherein T stands for at least one element selected from the group consisting of Fe and Co, M for at least one element selected from the group consisting of Zr, Hf, Nb, and Y, and A for at least one element selected from the group consisting of Si, Ge, Sn, B, P, and C, and x, z, and v respectively satisfy the expressions, $5 \leq x \leq 20$ at. %, $1 \leq z \leq 10$ at. %, and $0 \leq v \leq 2$ and having a microstructure consisting of a microcrystalline phase and a first amorphous phase and a second amorphous phase disposed around said phases.

2. The soft magnetic film according to claim 1, wherein the resistivity of said soft magnetic thin film is not less than 1000 μΩ·cm.

3. The soft magnetic film according to claim 1, wherein said z is in the range of from 2 to 9 at. %.

4. The soft magnetic film according to claim 1, wherein the saturation magnetization of said soft magnetic thin film is not less than 0.8 T.

5. The soft magnetic thin film according to claim 1, wherein M is Zr and A is Si.

6. A thin film magnetic element characterized by having the soft magnetic thin film of claim 1 in close contact with a substrate.

7. The thin film magnetic element according to claim 6, wherein said thin film magnetic element is a thin film magnetic head.

8. The thin film magnetic element according to claim 6, wherein said thin film magnetic element is a thin film magnetic inductor.

9. A method for the production of a soft magnetic thin film for use in a thin film magnetic element, characterized by comprising a step of forming a soft magnetic thin film of a microstructure having a composition substantially represented by the general formula; $T_{100-x-z}M_x(AO_v)_z$, wherein T stands for at least one element selected from the group consisting of Fe and Co, M for at least one element selected from the group consisting of Zr, Hf, Nb, and Y, and A for at least one element selected from the group consisting of Si, Ge, Sn, B, P, and C, and x, z, and v respectively satisfy the expressions, $5 \leq x \leq 20$ at. %, $1 \leq z \leq 10$ at. %, and $0 \leq v \leq 2$, and consisting of a microcrystalline phase and a first amorphous phase and a second amorphous phase disposed around said phases, said step comprising a substep of uniformly disposing a second film-forming target substantially represented by the general formula, $AO_w$, wherein A has the same meaning as defined above and w satisfies the expression, $1 \leq x \leq 2.5$ on a first film-forming target substantially represented by the general formula, $T_{100-x}M_x$ wherein T and M have the same meanings as defined above and x satisfies the expression, $5 \leq x \leq 20$ at. % at an area ratio of said second target to said first target in the range of 3 to 28% in an ambience of not less than 2 Pa.

10. The method according to claim 9, wherein the area ratio of said second target to said first target is in the range of from 5 to 20%.

* * * * *